United States Patent [19]

Humburg

[11] Patent Number: 5,749,516
[45] Date of Patent: May 12, 1998

[54] VEHICLE HEATER WITH CONTROL DEVICE

[75] Inventor: Michael Humburg, Göppingen, Germany

[73] Assignee: J. Eberspächer GmbH & Co., Esslingen, Germany

[21] Appl. No.: 656,184

[22] PCT Filed: Dec. 27, 1994

[86] PCT No.: PCT/EP94/04309

§ 371 Date: Jun. 3, 1996

§ 102(e) Date: Jun. 3, 1996

[87] PCT Pub. No.: WO95/18342

PCT Pub. Date: Jul. 6, 1995

[30] Foreign Application Priority Data

Dec. 31, 1993 [DE] Germany ............ 43 45 056.3

[51] Int. Cl.$^6$ ............................................. G05D 23/00
[52] U.S. Cl. ......................... 237/2 A; 237/12.3 C; 237/56
[58] Field of Search ..................... 237/56, 66, 12.3 C, 237/2 A

[56] References Cited

U.S. PATENT DOCUMENTS

| 3,494,599 | 2/1970 | Stupak, Jr. et al. ............ 237/66 |
| 4,394,960 | 7/1983 | Nakazawa ................. 237/12.3 C |
| 4,469,133 | 9/1984 | Boesing et al. ............... 137/625.29 |
| 4,616,484 | 10/1986 | Mehdi et al. ................... 62/238.6 |
| 5,092,521 | 3/1992 | Brown ........................ 237/12.3 B |
| 5,123,594 | 6/1992 | Humburg ........................ 237/2 A |
| 5,203,498 | 4/1993 | Kajikawa ........................ 237/2 A |
| 5,253,806 | 10/1993 | Gaysert et al. ................. 237/12.3 |
| 5,299,554 | 4/1994 | Mohring ....................... 237/12.3 |
| 5,404,842 | 4/1995 | Matsushiro et al. ............. 123/41.13 |
| 5,419,287 | 5/1995 | Evans ........................ 123/41.29 |
| 5,437,262 | 8/1995 | George, II et al. ............. 126/39 H |

Primary Examiner—Henry A. Bennett
Assistant Examiner—Derek S. Boles
Attorney, Agent, or Firm—McGlew and Tuttle

[57] ABSTRACT

An engine-independent vehicle heating appliance has a combustion air fan, a fuel dosing pump and a heat exchanger that surrounds the combustion chamber, as well as a controller that controls the operation of the vehicle heating appliance. In compact designs, special measures are required to protect the electronic components of the controller from overheating. In order to carry off heat in an effective manner, the controller has a heat conducting plate upon which the electronic power components (18) are mounted, their connections being electrically connected to the wiring on the board (16). Loss heat that results from the operation of the components (18) is carried away by the material of the heat conducting plate (8a, 8b) to the fan housing (6). Since the latter is always cool a sufficient cooling of the components (18) is ensured.

11 Claims, 1 Drawing Sheet

VEHICLE HEATER WITH CONTROL DEVICE

FIELD OF THE INVENTION

The present invention pertains to a vehicle heater with a burner, to which combustion air is fed by a combustion air blower equipped with a blower housing and to which fuel is fed by a fuel feed pump in order to generate a flame in a combustion chamber surrounded by a heat exchanger, and with a control device having electronic components arranged on a circuit board for controlling the operation of the vehicle heater.

BACKGROUND OF THE INVENTION

Such engine-independent vehicle heaters are used as auxiliary heaters in motor vehicles, but also in motor yachts, small airplanes, recreational vehicles, construction equipment, and the like.

The currently usual embodiments of such vehicle heaters use as the heat carrier water or water with antifreeze which is circulated by means of a circulating pump through a heating circuit containing a heat exchanger. A temperature sensor at the heat exchanger detects the temperature of the heat carrier, and the operation of the vehicle heater is controlled as a function of this temperature and other parameters, e.g., the desired temperature set. The control is assumed by the electronic control device, which receives condition signals from various parts of the vehicle heater, including the above-mentioned temperature sensor, and sends control and switching signals to defined parts of the heater, e.g., to the combustion air blower motor, the fuel feed pump, the circulating pump, the ignition unit, etc.

In many of the currently common vehicle heaters, the control device is located in the installed state at a point remote from the combustion chamber, because the electronic components of the control device are susceptible to the temperature and must be protected from heating by, e.g., the heat radiated by the combustion chamber and by the heat exchanger. Arranging the control device at a point remote from the other parts of the device can be achieved with relative ease, because only electric connections are necessary between the control device and the other parts of the heater.

However, the installation of these heaters, in which at least the control device, but optionally also the fuel feed pump and other parts are arranged at a point remote from the heat exchanger, i.e., the main body of the device, is labor-intensive. It would be considerably simpler to install the vehicle heater if it contained all components and it would thus be able to be installed as a compact assembly unit without much trouble.

However, it is not easy to design the vehicle heater as a compact assembly unit, which accommodates in itself all essential components of the device. One reason that argues against the compact design of the vehicle heater is, e.g., the above-mentioned requirement that the electronic components of the control device must not be excessively heated. However, if the control device is arranged at a short distance from the heat exchanger, sufficient cooling of the electronic components of the control possibly may not be guaranteed.

SUMMARY AND OBJECTS OF THE INVENTION

The object of the present invention is to provide a vehicle heater of the type described in the introduction in which it is always ensured that the electronic components of the control device are not excessively heated even in the case of compact design of the vehicle heater.

This object is accomplished according to the present invention with a vehicle heater of the above-described type by the control device being fastened to the blower housing and by at least one heat-conducting connection being formed between the blower housing and the control device.

Even though there is a certain proximity to the electric drive motor of the blower due to the close proximity of the control device to the combustion air blower, so that heat may reach the components of the control device from the drive motor, this effect can be practically ignored, because it is guaranteed due to the heat-conducting connection between the blower housing and the control device that the heat due to energy loss, which is generated by the electronic components, especially the electronic power components, can be adequately diverted into the blower housing. The housing of the combustion air blower is inherently one of the coolest points of the entire vehicle heater, because a relatively cool air flow flows through the blower during the operation of the heater. If the control device contains, e.g., driving transistors for driving the fuel feed pump or the like, the transistors generate a considerable power loss. This power loss, manifested as heat, is readily removed via the combustion air blower due to the arrangement of the control device according to the present invention.

In a special embodiment of the present invention, components of the control device are arranged on a circuit board; the circuit board is connected to a heat-conducting plate, and at least part of the components of the control device are mounted on the heat-conducting plate arranged on the blower housing. As was said, these are mainly power components which generate so much power loss in the form of heat during operation that a special cooling is indispensable.

In a geometrically especially preferred embodiment, the heat-conducting plate is arranged at right angles to the circuit board and preferably connected to same in one piece. Due to this embodiment, the electronic power components of the control device can be mounted flatly on the heat-conducting plate, and the terminals projecting from the component in parallel to the heat-conducting plate can be led into the contacting holes of the circuit board provided for this purpose. The heat-conducting plate is then arranged on the "underside" of the side channel blower of the combustion air blower facing the drive motor. The blowers in the vehicle heaters being discussed here are usually side channel blowers, so that the above-described arrangement of the heat-conducting plate of the control device is recommended.

An especially important, but at the same time good utilization of the space available is achieved by the heat-conducting plate having a base plate arranged flatly on the blower housing and a projection made in one piece therewith, and by one or more power components, whose electric terminals are connected to the board, being mounted on the projection. Consequently, the power components do not need to be arranged directly on the base plate, which is flatly in contact with the combustion air blower housing; sufficient heat dissipation is achieved even in the case of arrangement on the above-mentioned projection.

The space-saving arrangement according to the present invention is further improved by the fact that the control device is arranged on the blower housing such that it extends approximately in parallel to the longitudinal axis of the blower motor. The motor is usually of a cylindrical shape, whose diameter is smaller than the diameter of the side channel blower. If the outer circumference of the side channel blower is extended along the axis of rotation of the blower motor, a space, which is used according to the present invention to accommodate the components of the control device, is obtained in the circumferential area of the drive motor. An extremely compact design is achieved hereby, but sufficient cooling of the power components is still guaranteed because of the special arrangement of the heat-conducting plate of the control device on the combustion air blower.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
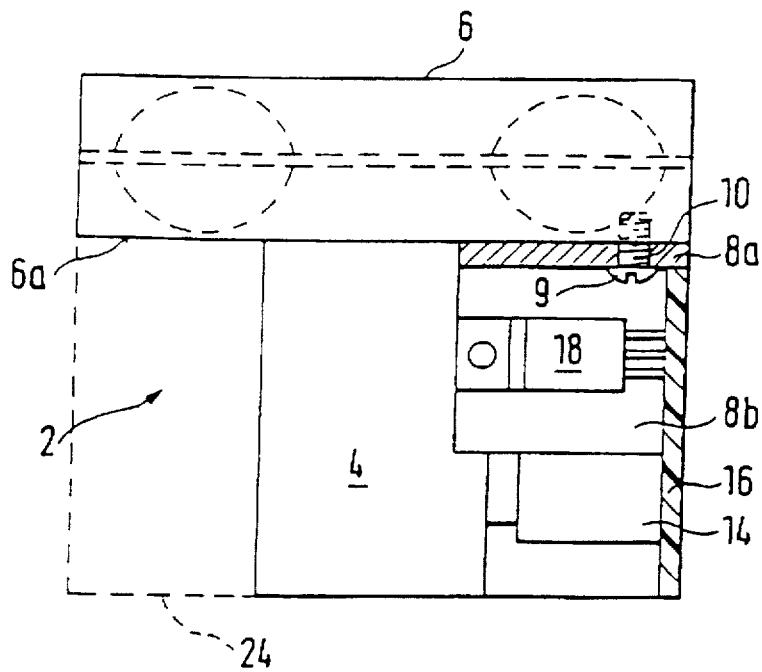
FIG. 1 is a schematic, partially cutaway top view of a combustion air blower with part of a control device.

The essential components of a vehicle heater were already mentioned above and are not specifically shown in the drawings. However, the person skilled in the art knows that how such vehicle heaters are designed, so that a detailed explanation of the general design of such heaters is unnecessary.

FIG. 1 shows a top view of a combustion air blower 2 with an electric blower motor 4 and with a blower housing 6. The blower motor 4 has an approximately cylindrical shape, and a drive shaft, which is not shown and at the top end of which the impeller of a side channel blower is arranged, extends concentrically therewith. The elements of the side channel blower are indicated by broken lines within the blower housing 6.

If the circumferential wall of the blower housing 6 is meant to be continued downward in FIG. 1, an annular space, which is used to accommodate the control device of the vehicle heater here, is obtained outside the blower motor 4. The said space surrounding the blower motor 4 may be closed by a cover 24.

Figure 2:
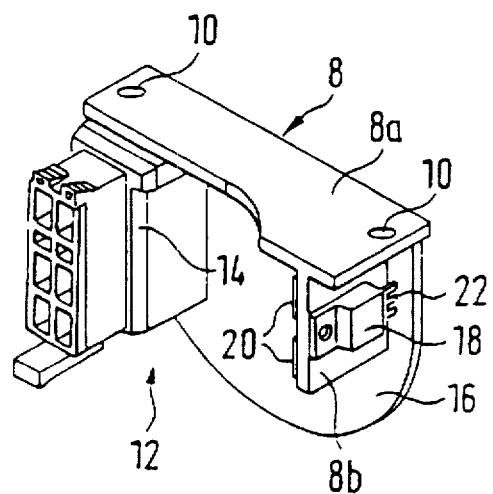
FIG. 2 is a perspective view of essential parts of the control device with circuit board, heat-conducting plate, a patch plug, and electronic power components.

FIG. 2 shows a perspective view of a control device 12 with a patch plug 14, which is mounted, like the power components 18 and 20 as well as additional components, not shown in the drawing, on a board 16. The board 16 is designed as a usual circuit board, whose horizontal projection is adapted to the cross-sectional shape of the vehicle heater, which shape is of no interest here.

A heat-conducting plate 8, which is rigidly connected to the board 16 and consists of a flat base plate 8a and a projection 8b joining it at right angles, extends at right angles to the plane of the board 16. The heat-conducting plate 8 consists of heat-conducting aluminum.

Holes 10, which are used to fasten the entire control device shown in FIG. 2 on an underside 6a of the blower housing 6 by means of screws 9, are located at the edges of the base plate 8a. As can be seen in FIG. 1, the top side of the base plate 8a, which is visible at the top of FIG. 2, is flatly in contact with the underside of the blower housing 6, so that good heat transfer between these parts is possible. The blower housing 6 is always relatively cool during the entire operation of the vehicle heater, so that heat reaching the base plate 8a is rapidly transferred to the blower housing 6.

FIG. 2 also shows that electronic power components 18 and 20 are arranged on the front side of the projection 8a, which is visible in FIG. 2, and on its rear side. The heat due to energy loss which is generated in the power components is readily conducted to the material of the projection 8b due to the flat arrangement of the power components 18 and 20 in order to reach the base plate 8a from there. The power components 18, 20 are electrically connected with connection pins 22 to the corresponding strip conductors on the circuit board 16. To simplify the representation, these strip conductors are not shown in the drawings.

Figure 3:
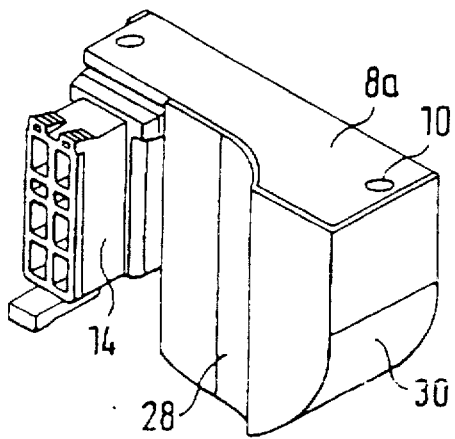
FIG. 3 is a perspective view of the control device according to FIG. 2, but covered by the housing of the control device.

FIG. 3 shows the control device according to FIG. 2 in a state in which it is covered by a control device housing 30. A recess 28, into which part of the outer wall of the blower motor 4 is fitted, is recognized.

The cooling measures described above, namely, the mounting of the power components 18 and 20 on the heat-conducting plate 8, which is fastened to the underside 6a of the blower housing 6, guarantee sufficient cooling. An additional ventilation of the control device housing 30 may be provided for safety, so that an air flow additionally flows through the interior of the housing 30.

The patch plug 14 is a socket part and it makes possible a rapid connection of the control device to the individual components of the vehicle heater via a cable, at the end of which a patch plug fitting the patch plug 14 is located.

While a specific embodiment of the invention has been shown and described in detail to illustrate the application of the principles of the invention, it will be understood that the invention may be embodied otherwise without departing from such principles.

I claim:

1. A vehicle heater, comprising:
    a burner;
    a combustion air blower for feeding combustion air to the burner, said combustion air blower including a blower housing;
    a fuel feed pump, said burner including a combustion chamber surrounded by a heat exchanger, said fuel feed pump for feeding fuel to said burner in order to generate a flame in said combustion chamber;
    a control device arranged on a circuit board and containing electronic components for controlling the operation of said burner;
    heat conduction means providing a heat conducting connection between said blower housing and said control device, said control device being fastened at said heat conduction means to said blower housing.

2. A vehicle heater according to claim 1, wherein said electronic components of said control device are arranged on said circuit board, said heat conducting connection including a heat conducting plate, said circuit board being connected to said heat conducting plate with at least some of said electronic components being mounted on said heat conducting plate.

3. A vehicle heater according to claim 2, wherein said heat conducting plate is arranged at a right angle with respect to said circuit board.

4. A vehicle heater according to claim 3, wherein said circuit board is connected to said heat conducting plate in one piece.

5. A vehicle heater according to claim 3, wherein said heat conducting plate is formed of a single piece.

6. A vehicle heater according to claim 3, wherein said heat conducting plate includes a base plate arranged to lie flat on a flat blower housing surface and said heat conducting plate includes a projection formed integrally with said heat conducting plate, one or more of said electrical components being power components with electrical terminals connected to said circuit board, mounted on said projection.

7. A vehicle heater according to claim 1, wherein said control device is arranged on said blower housing, said blower including a blower motor, said control device extending approximately in parallel to a longitudinal axis of said blower motor.

8. A vehicle heater according to claim 1, wherein:
said heat conduction means directly conveys heat from said electronic components to said blower housing.

9. A vehicle heater according to claim 1, wherein:
said heat conduction means directly contacts said electrical components and said blower housing.

10. A vehicle heater according to claim 1, wherein:
said heat conduction means includes a base plate arranged to lie flat on a flat blower housing surface and said heat conduction means includes a projection connected to said base plate;

one or more of said electrical components being power components with electrical terminals connected to said circuit board, mounted on said projection.

11. A vehicle heater in accordance with claim 10, wherein:
said base plate and said projection are formed integrally with each other.

\* \* \* \* \*